Aug. 9, 1938.    J. FRASER    2,126,103
LIQUID MEASURING AND DISPENSING APPARATUS
Filed Sept. 1, 1934    6 Sheets-Sheet 1

Inventor:- JOHN FRASER.

Aug. 9, 1938.   J. FRASER   2,126,103
LIQUID MEASURING AND DISPENSING APPARATUS
Filed Sept. 1, 1934    6 Sheets-Sheet 2
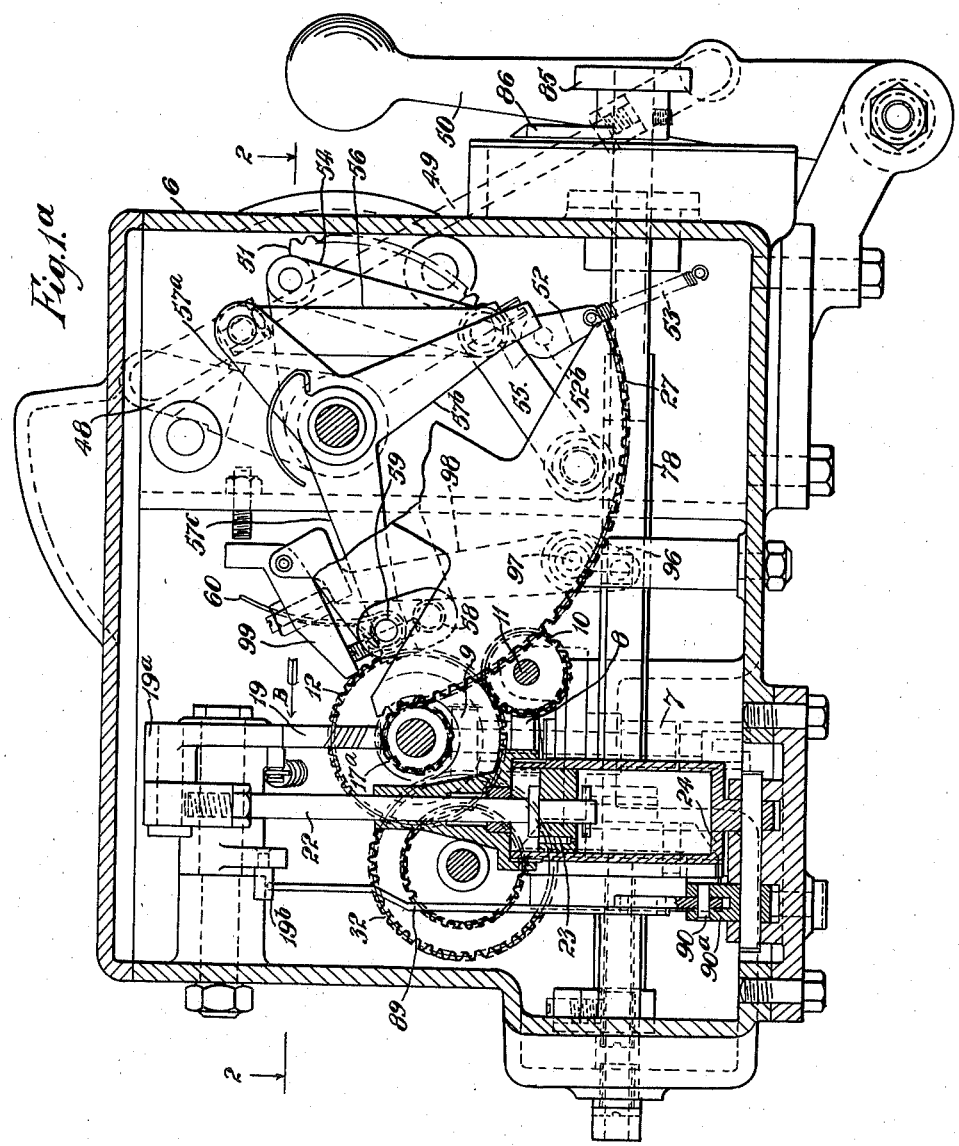
Inventor:-
JOHN FRASER.
Per:- George E. Folkes
Attorney.

Aug. 9, 1938.   J. FRASER   2,126,103
LIQUID MEASURING AND DISPENSING APPARATUS
Filed Sept. 1, 1934   6 Sheets-Sheet 3
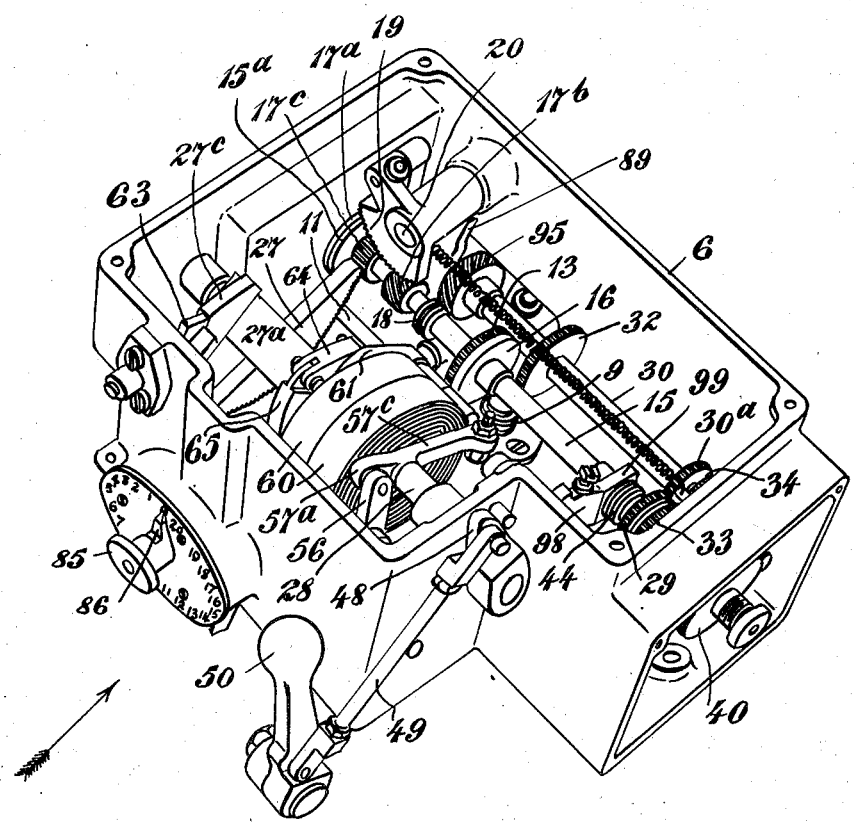
Fig. 1<sup>b</sup>
Inventor: JOHN FRASER.
Per: George E. Folke
Attorney.

Aug. 9, 1938.   J. FRASER   2,126,103
LIQUID MEASURING AND DISPENSING APPARATUS
Filed Sept. 1, 1934   6 Sheets-Sheet 4

Inventor:-
JOHN FRASER.
Per:- George J. Folkes
Attorney.

Aug. 9, 1938.　　　J. FRASER　　　2,126,103
LIQUID MEASURING AND DISPENSING APPARATUS
Filed Sept. 1, 1934　　　6 Sheets-Sheet 5
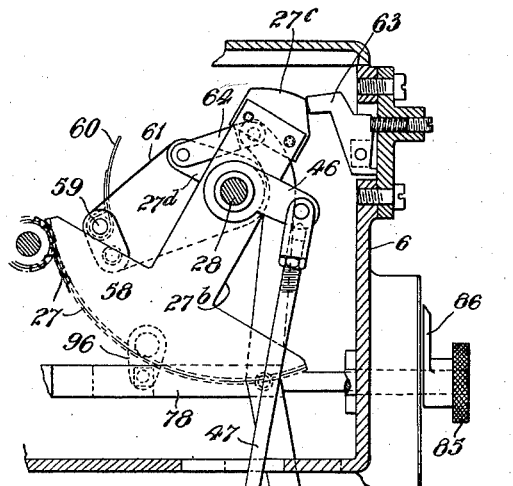
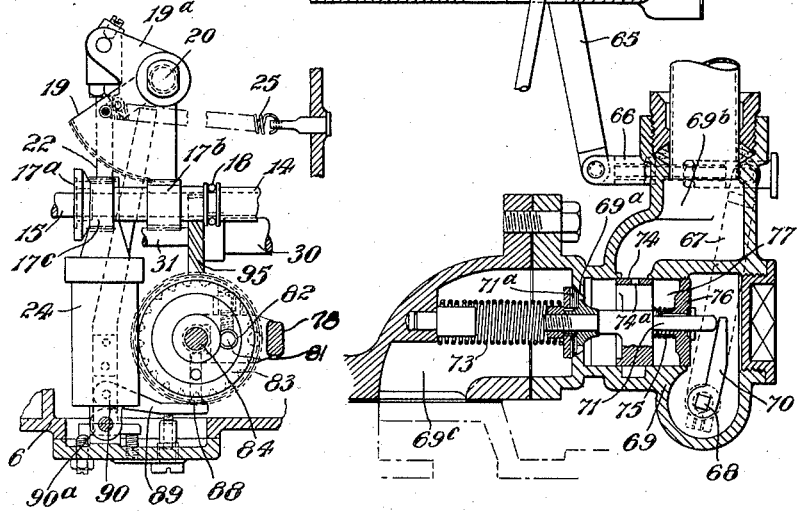
INVENTOR:-
JOHN FRASER.
PER:- George L. Folkes.
ATTORNEY.

Aug. 9, 1938.  J. FRASER  2,126,103
LIQUID MEASURING AND DISPENSING APPARATUS
Filed Sept. 1, 1934  6 Sheets-Sheet 6

INVENTOR:-
JOHN FRASER.
PER:- George E. Folkes.
ATTORNEY.

Patented Aug. 9, 1938

2,126,103

UNITED STATES PATENT OFFICE 2,126,103

LIQUID MEASURING AND DISPENSING APPARATUS

John Fraser, Clerkenwell Green, London, England, assignor to Avery-Hardoll Limited, London, England Application September 1, 1934, Serial No. 742,436
In Great Britain July 28, 1934

3 Claims. (Cl. 221—101)

This invention has reference to improvements relating to liquid measuring and dispensing apparatus and is concerned more particularly with apparatus for the said purpose of the liquid flow meter type, the present invention having for its object the provision of an improved mechanism which ensures the cessation of delivery when the predetermined quantity of liquid has been delivered and the automatic zeroizing of the indicating mechanism before the commencement of a delivery operation.

This invention consists of an improved mechanism for use in conjunction with liquid measuring and dispensing apparatus of the type hereinbefore referred to comprising in combination means for automatically cutting off the delivery of liquid when a predetermined quantity has been delivered, automatic means for zeroizing the indicating mechanism at each delivery operation and means the actuation of which results in the initiation of the zeroizing operation, the bringing into action of the predetermining mechanism and the starting of the motor for driving the pump.

The invention further resides in the details of construction of the improved mechanism for use in conjunction with liquid measuring and dispensing apparatus to be described hereinafter.

The invention will now be described with particular reference to the accompanying sheets of drawings which illustrate the invention as adapted for use with an electrically operated liquid measuring and dispensing apparatus of the flow meter type of known construction.

In the drawings:—

Figure 1a is a view, mainly in transverse vertical section, of the improved combined predetermining and zeroizing mechanism, the section being taken on a plane indicated by the line 1—1 in Figure 2 looking in the direction of the arrows to the said line.

Figure 1:
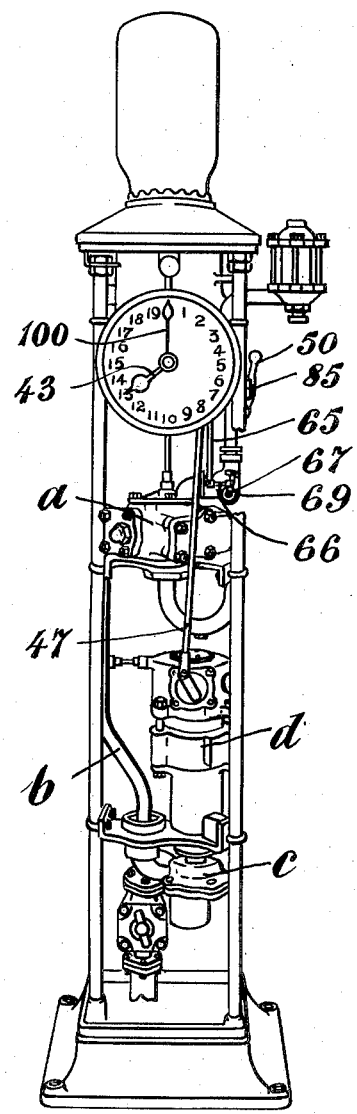
Figure 1 is a front elevation of the improved liquid measuring and dispensing apparatus with the sides of the housing removed in order to disclose the arrangement of the internal mechanism.
Figure 2:
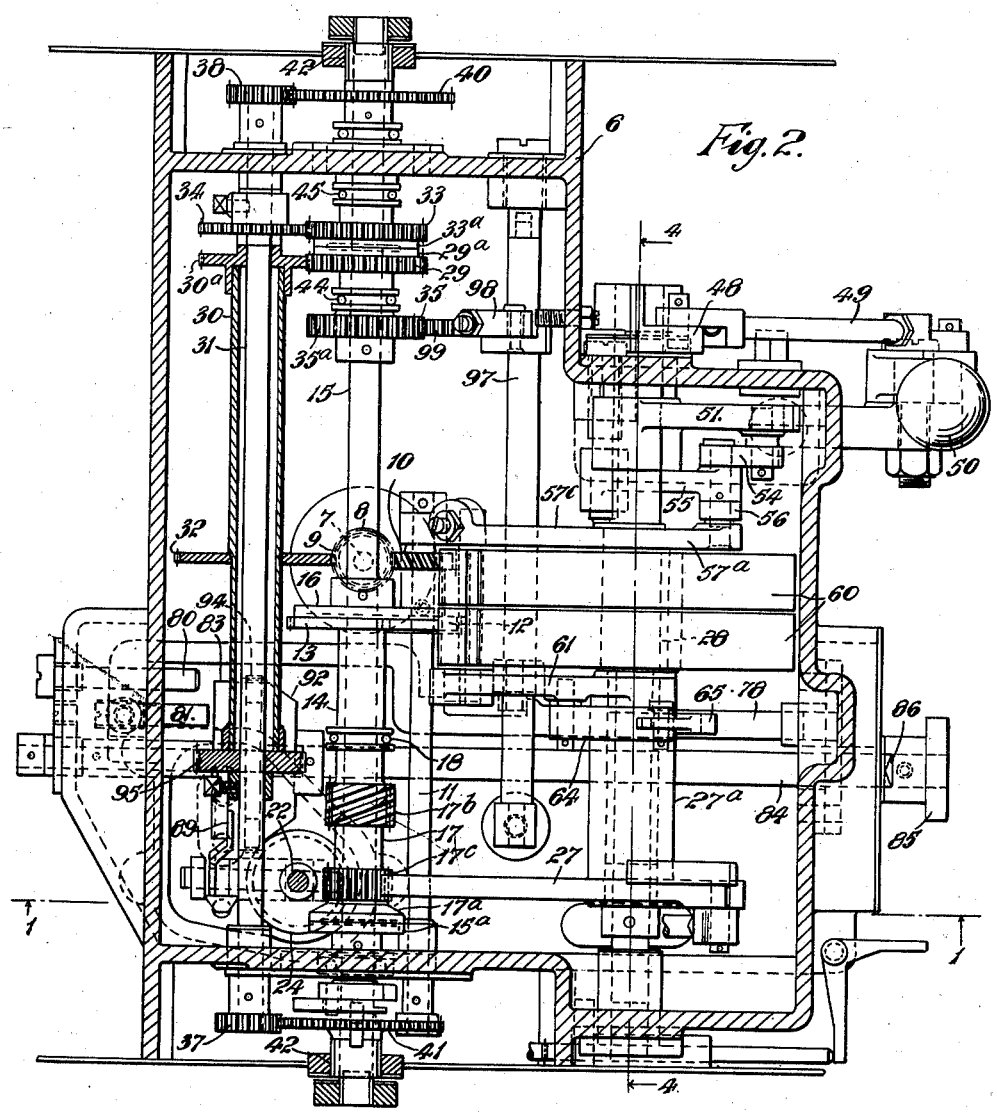

Figure 1b is a perspective view of the zeroizing mechanism with the top cover plate removed omitting the pointers and other parts which are not necessary to an understanding of the mechanism illustrated in this figure Figure 2 is a sectional plan view on a somewhat reduced scale of the mechanism illustrated in Figure 1a the section being taken on the line 2—2 in the said figure looking in the direction of the arrows.

Figure 3 is a segmental view showing the interconnection between the portion of the zeroizing mechanism seen on the right-hand side of Figure 1a and the delivery control means.

Figure 4:
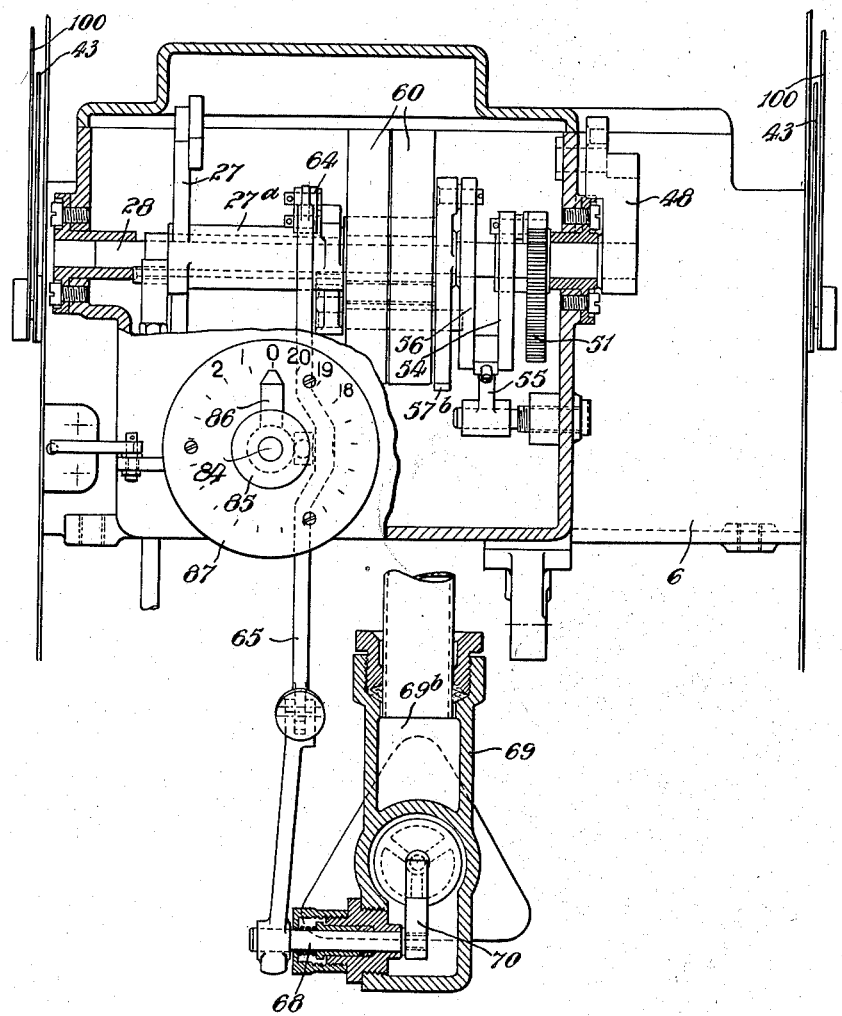

Figure 4 is a side view of the mechanism illustrated in Figures 1a and 2 with parts in section, the section being taken on the line 4—4 Figure 2 looking in the direction of the arrows to the said line, together with an end view in section of the delivery control means shown in the lower part of Figure 3 looking from the right-hand side of the said figure. In this figure parts of the mechanism are broken away or omitted where desirable for the sake of clearness and the zeroizing portion of the mechanism is viewed from the angle indicated by the arrow in Figure 1b.

Figure 5 is a fragmentary view illustrating in greater detail the means for driving the predetermining device and for coupling the zeroizing mechanism to the indicating pointers when required, corresponding parts being shown on a larger scale at the right-hand side of Figure 1a and the lower left-hand side of Figure 2.

In the embodiment of the invention illustrated in the drawings the combined predetermining and zeroizing mechanism is disposed within a casing 6, (see Figures 1a, 2 and 4) which is mounted on top of the housing within which the liquid flow meter (not shown) is disposed. This liquid flow meter $a$ is supplied with fuel from a supply pipe $b$ by means of a pump $c$ driven by an electric motor $d$. The spindle of the flow meter projects within the lower portion of the casing 6 and engages (see Figures 1a and 2) with a vertically disposed spindle 7 which has mounted thereon a pinion 8 and worm 9. The pinion 8 meshes with a spur wheel 10 fixed on the rear end of a longitudinally disposed shaft 11 mounted in bearings carried by the housing 6. Intermediate its ends the shaft 11 has fixed thereon a pinion 12 the teeth whereof mesh with the teeth of a pinion 13 formed at the rear end of a sleeve 14 which is rotatably mounted on a longitudinally disposed shaft 15 hereinafter referred to as the quick motion shaft. The sleeve 14 is capable of a slight axial displacement on the quick motion shaft 15 for a purpose to be described hereinafter. On the rear side of the pinion 13 the quick motion shaft 15 has pinned thereto a friction disc 16 the purpose of which will be related hereinafter. Rotatably mounted on the forward portion of the quick motion shaft 15 is a second sleeve 17, hereinafter termed the clutch sleeve. At its forward end (see Figure 2) the said clutch sleeve 17 is provided with an annular clutch face 17ª having an acting surface of a material having a high co-efficient of friction said clutch face 17ª co-operating with a corresponding clutch face 15ª carried by a coupling disc pinned to the quick motion shaft 15. Intermediate the sleeves 14 and 17 is disposed a ball thrust bearing 18. Adjacent to its rear end the clutch sleeve 17 is formed with a skew wheel 17ᵇ the teeth whereof mesh with the teeth of a quadrant 19 (see Figures 1a and 5) carried by a shaft 20 rockably mounted in bearings supported by the casing 6. The quadrant 19 has an arm 19ª to which is pivotally connected the upper end of the connecting rod 22 of a dashpot of the piston and cylinder type. The piston 23 is of a type which is loosely mounted on the connecting rod 22 and the cylinder 24 of the dashpot is supported from the base of the housing 6. The quadrant 19 is secured to one end of a coil spring 25 the other end of which is anchored to the housing 6, said spring 25 tending to cause the quadrant 19 to draw the clutch sleeve 17 in a rearward direction, that is to disengage the clutch faces 17ª and 15ª. Intermediate the clutch face 17ª and the pinion 17ᵇ the clutch sleeve 17 is formed with a pinion 17ᶜ the teeth whereof mesh with the teeth of a quadrant 27, hereinafter termed the re-setting quadrant, loosely mounted on a longitudinally disposed shaft 28, hereinafter referred to as the operating shaft (see Figures 1, 3 and 4). Pinned to the rearward portion of the quick motion shaft 15 is a cam disc 35 having a cut-away portion 35ª (see Figure 1a) for a purpose to be referred to hereinafter. Mounted on the quick motion shaft 15 on the rearward side of the cam disc 35 (see Figures 1a and 2) is a pinion 29 the teeth whereof mesh with the teeth of a pinion 30ª fixed on the rearward end of a sleeve 30 rotatably mounted about a longitudinally disposed shaft 31, hereinafter termed the slow motion shaft, the said sleeve 30 carrying intermediate its ends a worm wheel 32 which meshes with the worm 9 mounted on the spindle 7. The pinion 29 (see Figure 2) is formed with a friction clutch face 33ª carried by the pinion 33 also mounted on the quick motion shaft 15 but to the rear of the pinion 29. The teeth of the pinion 33 mesh with the teeth of a pinion 34 fixed to the rear end portion of the slow motion shaft 31. The slow motion shaft 31 has fixed on the front and rear ends thereof pinions 37 and 38 respectively the teeth whereof mesh with the teeth of pinions 40 and 41 mounted on the quick motion shaft 15, said pinions carrying the bosses 42 of the unit indicating pointers 43. The pinion 41 co-operates with an arm 41ª carried by the quick motion shaft 15 in a known manner and for a known purpose which furthermore will be set forth hereinafter.

A ball thrust race 44 is interposed between the pinion 29 and the cam disc 35 and a ball thrust race 45 between the pinion 33 and adjacent wall of the casing 6.

Secured to the front of the quadrant arm 27ᵇ (see Figure 3) is an arm 46 which is pivotally connected to the upper end of a rod 47 for operating the electric motor which drives the pump, said rod 47 being termed hereinafter the switch operating rod.

Fixed on the rear end of the operating shaft 28 (see Figures 1a and 2) is a crank arm 48 to which is pivotally connected the upper end of a rod 49 the lower end of which is pivotally connected to a lever 50 fulcrumed externally on the casing 6, said lever being termed hereinafter the actuating lever. Also fixed on the operating shaft 28 (see Figures 1a, 2 and 4) is a toothed quadrant 51 the teeth whereof co-operate with a double acting pawl 52ª formed at the end of one arm of a lever 52 the other arm of which is attached to a coil spring 53 the other end of which is anchored to the casing 6, said coil spring 53 tending to maintain the pawl 52ª in engagement with the teeth of the quadrant 51. Pivotally connected to the upper portion of the quadrant 51 is the upper end of a link 54 the lower end of which is pivoted to a radius link 55 and to the lower end of a link 56 the upper end whereof is anchored to the arm 57ª of a three-armed member (see Figure 1a) rotatably mounted on the operating shaft 28. The other arms 57ᵇ, 57ᶜ, of the said three-armed member co-operate with a pin 58 carried by a plate 61 fixed to the quadrant sleeve 27 for a purpose to be set forth hereinafter. The plate 61 also carries a pin 59 to which is anchored the outer ends of a pair of clock springs 60 which are wound around the operating shaft 28 and have their inner ends secured to the boss of the three armed member. The said re-setting quadrant 27 is formed with an upwardly projecting portion which has fixed to the end thereof a cam plate 27ᶜ which co-operates with a spring-controlled detent 63 for a purpose to be described hereinafter.

Pivotally connected to the plate 61 (see Figures 3 and 4) is one end of a link 64 the other end of which is anchored to the upper end of a lever 65, hereinafter termed the valve control lever, the lower end of which is pivotally connected to a link 66 which is pivoted to the upper end of an arm 67 fixed on an externally projecting portion of a spindle 68 rotatably mounted in a casing 69, hereinafter termed the valve housing. Fixed to the inner end of the spindle 68 is an arm 70, hereinafter termed the valve operating arm, the upper end of which abuts the stem 71 of a delivery valve. The head 71ª of the valve abuts one end of a coil spring 73 the other end of which takes an abutment against a portion of the valve housing 69, said spring 73 tending to maintain the seating of the valve head 71ª on the seating 69ª provided therefor in the valve housing 69, the valve seat 69ª constituting a means of communication between the inlet (69ᶜ) and outlet (69ᵇ) sides of the housing 69.

Secured on the stem 71 (see Figure 3) is a ported annular piston valve 74 having the porthole 74ª provided in the upper portion of the skirt of the said valve 74 and disposed between the said valve and the free end of the stem is a light spring 75 which abuts a disc 76 slidably mounted on the stem 71 and serving as a dividing means between the chamber 77 intermediate the said disc 76 and annular piston valve 74 and the portion of the valve housing within which the arm 70 is located. The central portion of the disc 76 is provided with a longitudinally disposed through passage.

Intermediate its ends the valve control lever 65 (see Figures 1ª and 2) is pivotally connected to a transversely disposed slidable rod 78 which is cranked at its one end and provided in the said cranked portion with a hole through which is passed a peg 80 for preventing rotation of the said rod 78.

The cranked portion of the rod 78 also carries a peg 81 which co-operates with a hole 82 (see Figure 5) formed in a toothed wheel 83, hereinafter termed the setting wheel, said wheel being fixed on a rotatable transversely disposed shaft 84, hereinafter termed the setting pointer shaft.

This setting pointer shaft 84 projects at one end from the casing 6 (see Figure 4) and has fixed thereon a knob 85 carrying a pointer 86 which co-operates with a chart 87 carried by the housing.

The teeth of the setting wheel 83 co-operate with a locating pawl 88 which is fixed to the shorter arm of a lever 89 fulcrumed at 90 on one arm of an adjustable bell crank lever 90a (see Figure 5) whereby the fulcrum may be adjusted in order to obtain the required setting of the pawl 88 relatively to the teeth of the said setting wheel 83.

The pawl 88 co-operates with the teeth of the setting wheel 83 so as to definitely locate the said wheel during the setting operation. In order to prevent undesirable friction on the setting wheel when the mechanism is in operation a pin 19b on the quadrant 19 is caused to bear on the longer arm of the lever 89 and to rock the said lever so that the pawl 88 is disengaged from the teeth of the setting wheel.

Fixed on the setting pointer shaft 84 is a collar between which and the setting wheel 83 is loosely mounted a pinion 94 (see Figure 2) the teeth whereof mesh with a pinion 95 (see Figure 5) mounted on the sleeve 30.

Pivotally connected to the slidable rod 78 is the lower end of a crank-arm 96 which is fixed on a longitudinally disposed shaft 97. This shaft 97 has fixed thereto an upstanding arm 98 carrying a pawl 99 which co-operates with the cam disc 35 hereinbefore referred to.

The operation of the mechanism is as follows:—

The knob 85 (see Figure 4) is turned until the pointer 86 indicates on the dial 87 the number of gallons of liquid required to be delivered at the subsequent delivery operation. The rotation of the knob 85 entails the rotation of the setting pointer shaft 84 and of the setting wheel 83, the co-operation between the pawl 88 and the teeth of the setting wheel 83 ensuring the definite location of the wheel so that the position of the hole 82 with respect to pin 81 has a definite relation to the number of gallons indicated on the dial 87 (see Figures 2, 4 and 5).

In the setting position the pinion 94 (see Figure 2) is loose between the said wheel 83 and the collar 92.

The lever 50 is now drawn downwardly and, through the rod 49 and crank 48, caused to effect a rotation of the operating shaft 28 (see Figures 1a, 3 and 4). The rotation of the operating shaft 28 entails a corresponding movement of the quadrant 51 which is imparted to the three-armed member mounted on the operating shaft 28 through the links 54 and 56, the arm 57b of the said three-armed member contacting during the later stages of the said movement with the pin 58 (see Figure 1a). During the rotation of the shaft 28, and prior to the arm 57b contacting with the said pin 58, the clock springs 60 are fully wound (see Figure 1a). On the arm 57b contacting with the pin 58 the continued movement of the shaft 28, and hence of the three-armed member, results in the rotary force being applied to the quadrant 27 whereby the detent 63 is forced out of locking engagement with the quadrant arm 27c thus allowing the quadrant 27 to rotate under the energy stored in the clock springs 60 (see Figures 1a and 1b). The movement of the quadrant 27 by reason of the meshing of the teeth thereof with the pinion 17c on the sleeve 17 results in a rotation of the sleeve and by virtue of the engagement between the teeth of the quadrant 19 and the skew pinion 17b on the sleeve the said sleeve is moved forwardly and caused to force the clutch faces 17a and 15a into firm engagement and thus to couple the quick motion shaft 15 to the sleeve 17, a driving engagement obtaining between the clutch faces 17a and 15a by reason of the resistance afforded by the dashpot (see Figures 1a and 1b). The subsequent rotation of the sleeve 17 which obtains returns the fraction pointer 100 to zero through the quick motion shaft 15. The forward movement of the sleeve 17 requisite to bring the clutch faces 17a and 15a into driving engagement also entails the disengagement of the clutch faces 13 and 16 and 29a and 33a (see Figures 1b and 2). The rotation of the quick motion shaft 15 during the zeroizing of the fraction pointer 100 results in the arm 41a carried by the said shaft coming into engagement with and effecting a rotation of the pinion 41 (see Figure 2). The rotation of this pinion 41 and the slow motion shaft 31 returns the units pointers 43 to zero as determined by the fixed stop in known manner (see Figure 2). The movement of the quadrant 27 through the plate 61 and link 64 effects a rocking of the valve control lever 65 and initially this movement takes place about the pivot connecting the said lever 65 to the link 66 as a fulcrum whereby the movement of the rod 78 which is also entailed draws the peg 81 into contact with the face of the setting wheel 83 and moves it axially on the shaft 84 thereby clamping the pinion 94 between the said setting wheel 83 and the collar 92 so that the shaft 84 is coupled to the sleeve 30 through the said pinion 94 and its complementary pinion 95 (see Figures 2 and 5). When the peg 81 comes into contact with the face of the setting wheel 83 further movement of the lever 65 about the aforementioned fulcrum is prevented and the continued movement of the lever 65 which takes place with the continued movement of the link 64 takes place about the point of connection of the lever 65 to the slidable rod 78 as a fulcrum (see Figure 3). This change of the fulcrum results in a pull being exerted on the link 66 which, through the arm 67, shaft 68 and arm 70, opens the valve 71 against the action of the spring 73 (see Figure 3).

As the completion of the delivery of the predetermined quantity of liquid is approached the hole 82 comes into register with the peg 81 whereupon the said peg 81 is drawn into the hole by the valve spring 73 acting through the valve 71, arms 70 and 67, links 66, valve control lever 65 and slidable rod 78 (see Figures 2 and 3). The slidable movement of the rod 78 turns the lever 65 about the point of connection of the said lever to the link 64 and allows the arms 67 and 70 to move to such an extent that the outlet orifice in the casing 69 is closed by the annular piston 74, liquid can then continue to pass from the inlet 69c through the hole 74a in the said piston (see Figure 3). The movement of the slidable rod 78 also results in the rocking of the shaft 97 whereby the pawl 99 is moved into contact with the periphery of the cam disc 35 (see Figures 1a and 2).

When a zeroizing operation has been completed the tension in the spring 25 through the quadrant 19 and associated skew gear effects a release of the driving engagement between the clutch faces 17a and 15a and entails a driving connection between the clutch faces 13 and 16 and 29a and 33a (see Figures 2 and 5). As a consequence during a metering operation unrestricted movement of the indicator shafts 15 and 31 is permitted. The drive to the slow motion shafts 31 is taken from the pinion 32 by way of the sleeve 30, pinion 30ª, pinions 29 and 33 to the pinion 34 on the said slow motion shaft 31 (see Figure 2).

When the predetermined quantity of liquid has been delivered the gapped portion of the cam 35 comes into register with the pawl 99 whereupon the said pawl moves downwardly and, through the lever 96, permits a further movement of the lever 65 which results in the valve 71 completely closing and cutting off any further delivery (see Figure 2).

On the initial closing movement of the valve 71 the annular piston valve 74 compresses the light spring 75 so that the said piston valve bears against the disc 76 which acts as the piston of a dashpot and ensures a regulated closing movement of the piston valve 74, thereby preventing hammering of the liquid in the pipe lines (see Figure 3). Before the final closing movement of the said valve 71 the spring 75 has come into action and moved the disc 76 away from the annular piston valve 74 to an extent greater than the degree of movement requisite to the final closing of the valve 71 and thus a substantially instantaneous cut-off is effected by the valve 71 on its final movement (see Figure 3).

The motor is shut off by returning the handle 50 to its initial position and this operation also effects a re-setting of the parts controlled by the shaft 28 in readiness for the succeeding delivery operation (see Figures 1a, 1b and 2). On the return movement of the shaft 28 the arm 57ᶜ of the three-armed member contacts with the pin 58 and re-sets the quadrant 27 with the detent 63 in locking relationship with the arm 27ᶜ of the said quadrant (see Figure 3). The rotation of the shaft 28 on the re-setting operation through the lever 65 is caused also to move the shaft 78 so as to disengage the peg 81 from the hole in the setting disc 83 and restores the pawl 99 to the initial position (see Figure 2). During a re-setting operation the dashpot offers no resistance.

As has been mentioned hereinbefore after the setting of the wheel 83 the arm 89 in the initial operation of the mechanism is caused to rock the pawl 88 out of engagement with the teeth of the said wheel (see Figure 5).

It will also be appreciated that as the zeroizing effort continues momentarily after the starting of the motor a uniform dilation of the hose always obtains prior to a delivery as delivery does not take place until the standard bye-pass pressure has been attained, consequently any allowance that may be made for "overage" due to the differences of dilation of the hose is not multiplied according to the number of units to be delivered at any one operation.

What I claim as my invention and desire to secure by Letters Patent is:—

1. Liquid measuring and dispensing apparatus embodying in combination a liquid flow meter, a pump for forcing the liquid to be measured and dispensed to said flow meter, an electric motor for driving said pump, an indicating mechanism driven from the flow meter, a zeroizing means for the said indicating mechanism, a settable device for predetermining the quantity of liquid to be delivered at any one delivery operation, means for coupling the settable device to the flow meter, a delivery control valve and a manually operable control member common to the aforesaid motor, zeroizing means and coupling means, the manipulation of the said common control member prior to a delivery operation effecting the starting of the motor, the coupling of the settable device to the flow meter and the opening of the delivery control valve.

2. Liquid measuring and dispensing apparatus embodying in combination a liquid flow meter, a pump for forcing the liquid to be measured and dispensed to said flow meter, an electric motor for driving said pump, an indicating mechanism driven from the flow meter, a zeroizing means for said indicating mechanism, a settable device for predetermining the quantity of liquid to be delivered at any one delivery operation, means for coupling the settable device to the flow meter, a delivery control valve, a manually operable control member common to the said motor, zeroizing mechanism and coupling means and a lever connected with the control member, with the settable device and with the delivery valve said lever being pivoted so that the initial movement of the control member causes the lever to operate the coupling means and a subsequent movement of the control member to cause the said lever to effect the opening of the delivery control valve.

3. A liquid measuring and dispensing apparatus, according to claim 1, having a zeroizing mechanism comprising an energy storing device and means actuated by the common control member for storing energy in the said energy storing means during the initial movement of the control member and for releasing the stored energy to actuate the zeroizing mechanism during a later movement of the control member.

JOHN FRASER.